June 2, 1942.  J. R. NALBACH  2,284,675
VARIABLE SPEED DEVICE
Filed Oct. 7, 1940   5 Sheets-Sheet 4
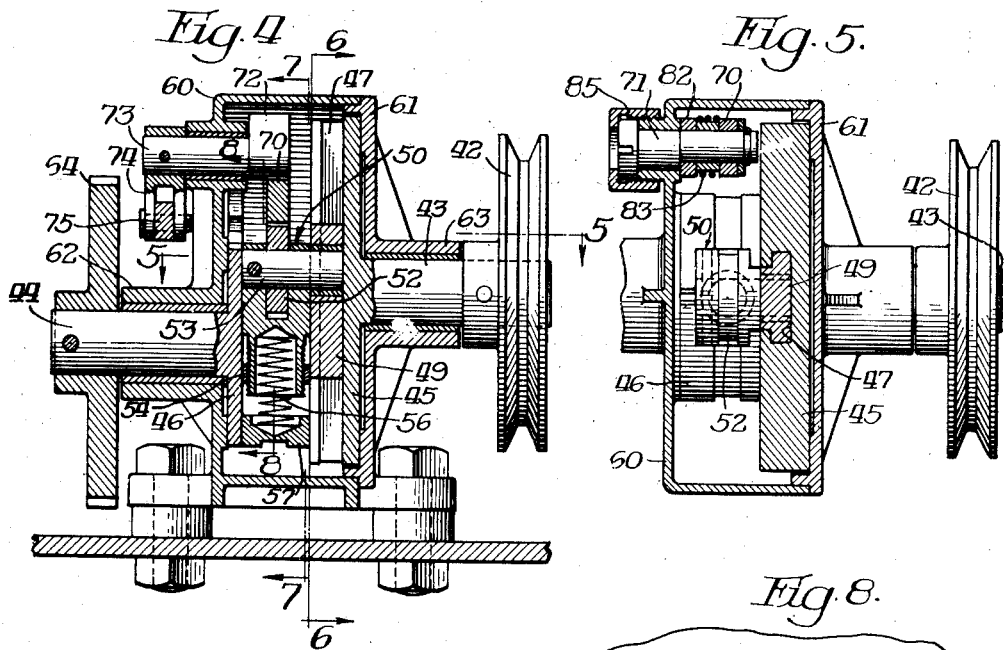
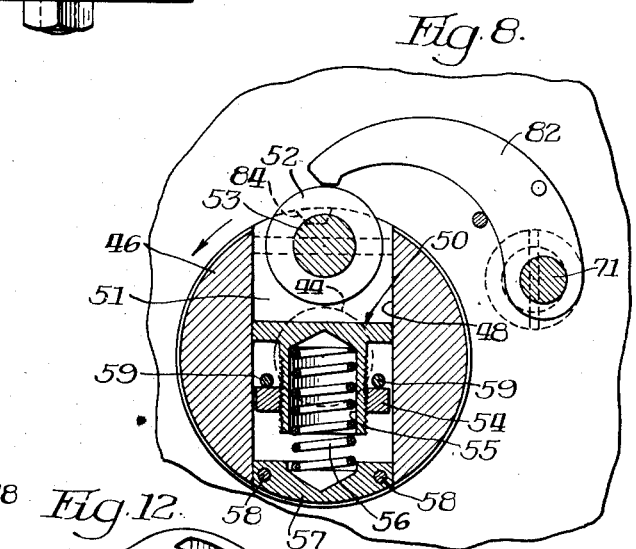
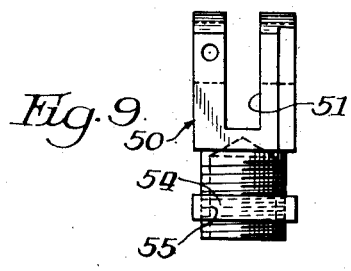
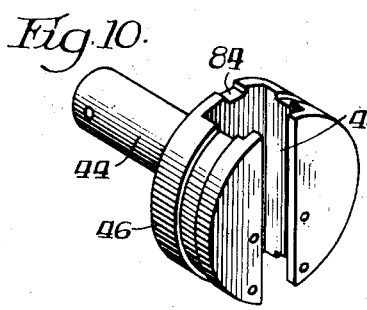
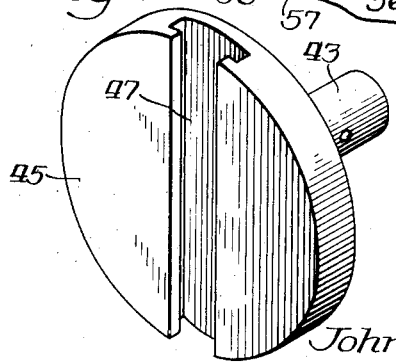
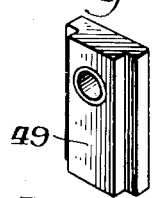
Inventor:
John R. Nalbach,
By: Zabel, Carlson, Gritzbaugh & Wells,
Attys.

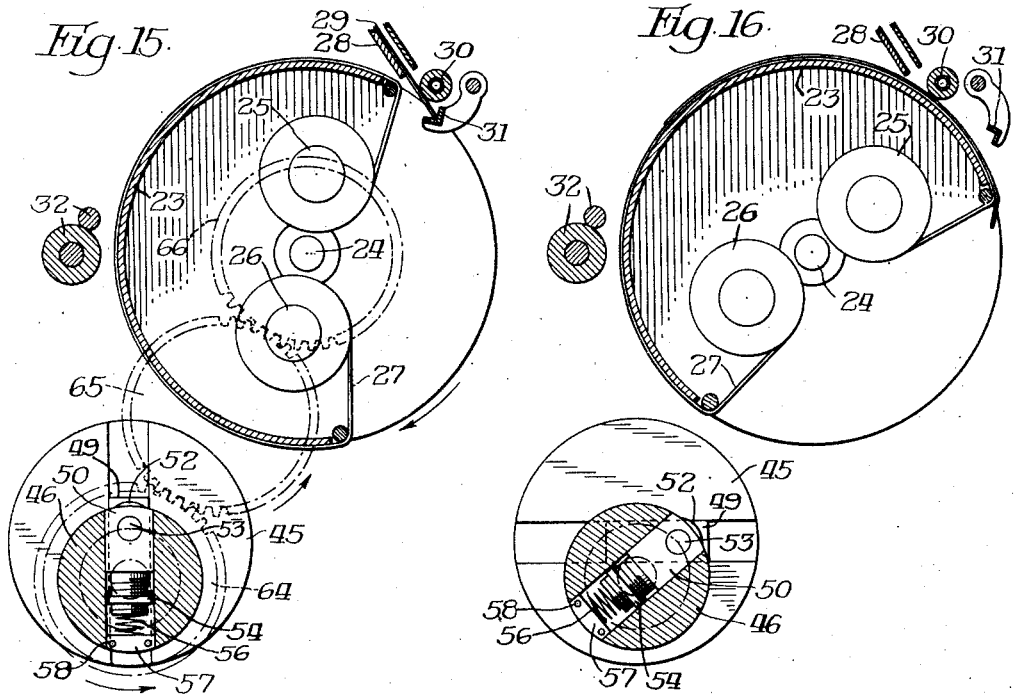
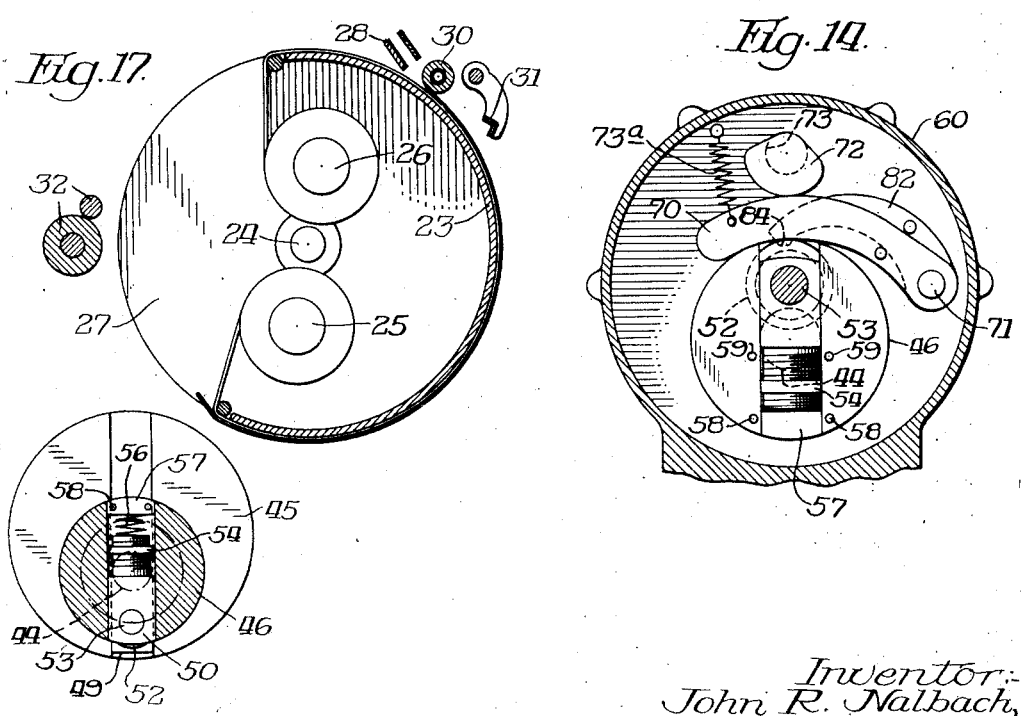

Patented June 2, 1942

2,284,675

UNITED STATES PATENT OFFICE 2,284,675

VARIABLE SPEED DEVICE

John R. Nalbach, Oak Park, Ill.

Application October 7, 1940, Serial No. 360,155

21 Claims. (Cl. 101—132)

This invention relates to variable speed devices by which a drive member rotating at uniform speed gives the driven member a series of revolutions in each of which the speed of movement is gradually built up and then gradually cut down. It is the object of the invention to provide in a device of this type a new and improved arrangement of parts by which improved results are attained and the uses for which the device is adapted are broadened and extended.

It is one of the objects of the invention to provide improved control means for an arrangement of this type for enabling use of the mechanism as a clutch for effecting intermittent driving in which the driven member is automatically stopped so as to remain idle until again thrown into operation independently of the clutch. In this arrangement, the speed of movement of the driven member is preferably built up gradually and smoothly in each revolution and then gradually and smoothly cut down in preparation for a stop at the end of the revolution, the movement of the driven member comprising thus acceleration to high speed in the first half of each revolution followed by deceleration in the second half, the high speed movement being at sufficiently increased speed to compensate for the delay brought about by the stoppage. The wear and tear on the mechanism and the noise incident to the operation are thus reduced to a minimum.

It is one of the objects of the invention to provide an arrangement of this type in connection with a duplicating machine in the operation of which it is desirable that a rotary drum be driven intermittently with a minimum strain on the drum and its associated parts.

In one form of arrangement, a drive shaft and a driven shaft are arranged substantially end to end but with the axis of one shaft slightly eccentric with respect to the axis of the other, an improved form of driving connections being provided between the shafts, comprising a pivotal connection means carried by one of the shafts so as to be movable with respect to the other shaft for exerting a continuously changing leverage on said other shaft whereby rotation of the drive shaft at uniform speed produces a rotation of the driven shaft at constantly changing speed. In the arrangement shown, the construction comprises means also by which the pivotal connection means can be moved into centered position with respect to the axis of the drive shaft so as to hold the driven shaft stationary while the rotation of the drive shaft continues, and by which the pivotal connection means can then be moved again into operative eccentric position with respect to said drive shaft for a renewed driving. The means for accomplishing these purposes is preferably arranged so as to cause the movement of the pivotal connection means into centered position for stopping rotation of the driven shaft to be timed so as to take place during the comparatively slow speed portion of the rotation of the driven shaft, and to cause the movement of the pivotal connection means again into eccentric driving position to take place at such time and under such conditions as to insure that the driven shaft shall be brought gradually and smoothly to its higher speed movement.

For accomplishing these results, the pivotal connection means is preferably made adjustable radially toward and from the axis of the driven shaft, with a spring normally holding the pivotal connection means yieldingly at the limit of its movement outwardly. A pivotally mounted arm is arranged so as to be moved by a cam into and out of position for operative engagement with the pivotal connection means. In the construction illustrated, a foot lever is provided for giving the cam the required movements for controlling the position of the arm. A pivotally mounted latch is also provided in connection with the arm adapted by operative engagement with the driven shaft to hold the driven shaft releasably in a definite predetermined fixed position when brought to a stop by the driving means.

Means is also provided for adjusting the pivotal connection means radially with respect to the shaft by which said pivotal connection means is carried so as to change the leverage of one shaft on the other shaft and thus to vary the ratio between the high speed rotation and the low speed rotation of the driven member.

It is another object of this invention to improve arrangements of this type in sundry details hereinafter pointed out. The preferred means by which the several objects have been attained are illustrated in the accompanying drawings, in which—

Fig. 4 is a vertical sectional view taken substantially at the line 4—4 of Fig. 1;

Fig. 5 is a horizontal sectional view taken substantially at the line 5—5 of Fig. 4;

Figure 3:
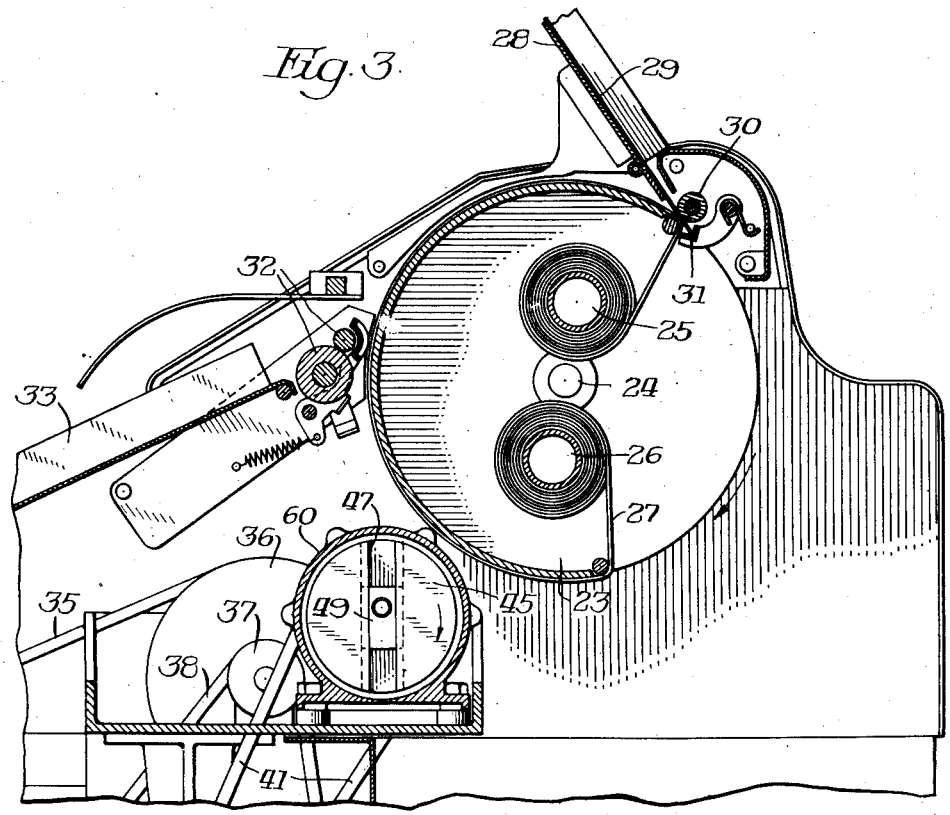
Fig. 3 is a vertical sectional view taken substantially at the line 3—3 of Fig. 2.
Figure 6:
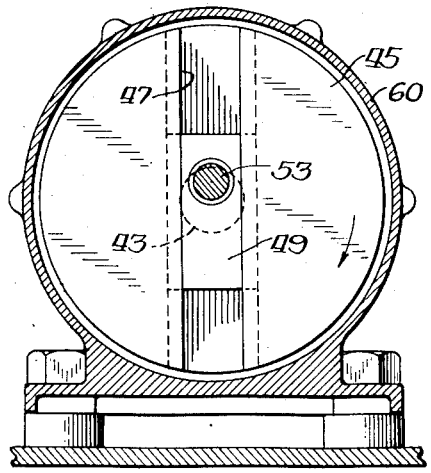
Figure 7:
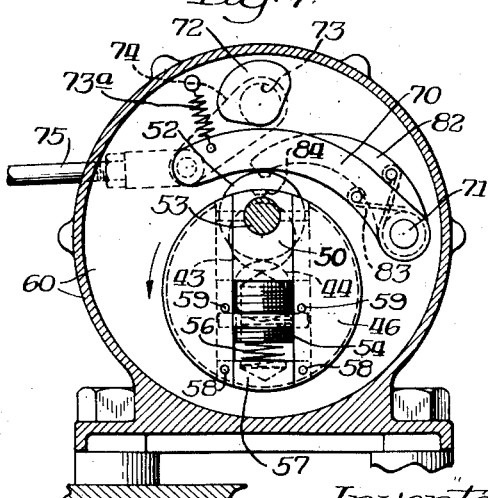

Figs. 6, 7 and 8 are vertical sectional views taken substantially at the line 6—6, the line 7—7, and the line 8—8, respectively, of Fig. 4;

Fig. 9 is an edge face view of a slide block forming a part of the connecting means between the driving shaft and the driven shaft, being shown on a slightly reduced scale as compared with Fig. 8;

Fig. 10 is a perspective view of the driven shaft and the grooved head thereon in which the slide block of Fig. 9 is mounted;

Fig. 11 is a perspective view of a mounting block carried by the grooved head as shown in Fig. 10;

Fig. 12 is a perspective view of the driving shaft and the grooved head thereon;

Fig. 13 is a perspective view of the slide block operating in the grooved head as shown in Fig. 12;

Fig. 14 is a diagrammatic view showing certain of the parts as seen in Fig. 7 but showing a changed position of the parts for stopping the rotation of the driven member, and showing also diagrammatically the relative position of the drive shaft; and Figs. 15, 16 and 17 are diagrammatic views showing a construction similar to that illustrated in Fig. 3 and showing changed positions of the operating parts.

Figure 2:
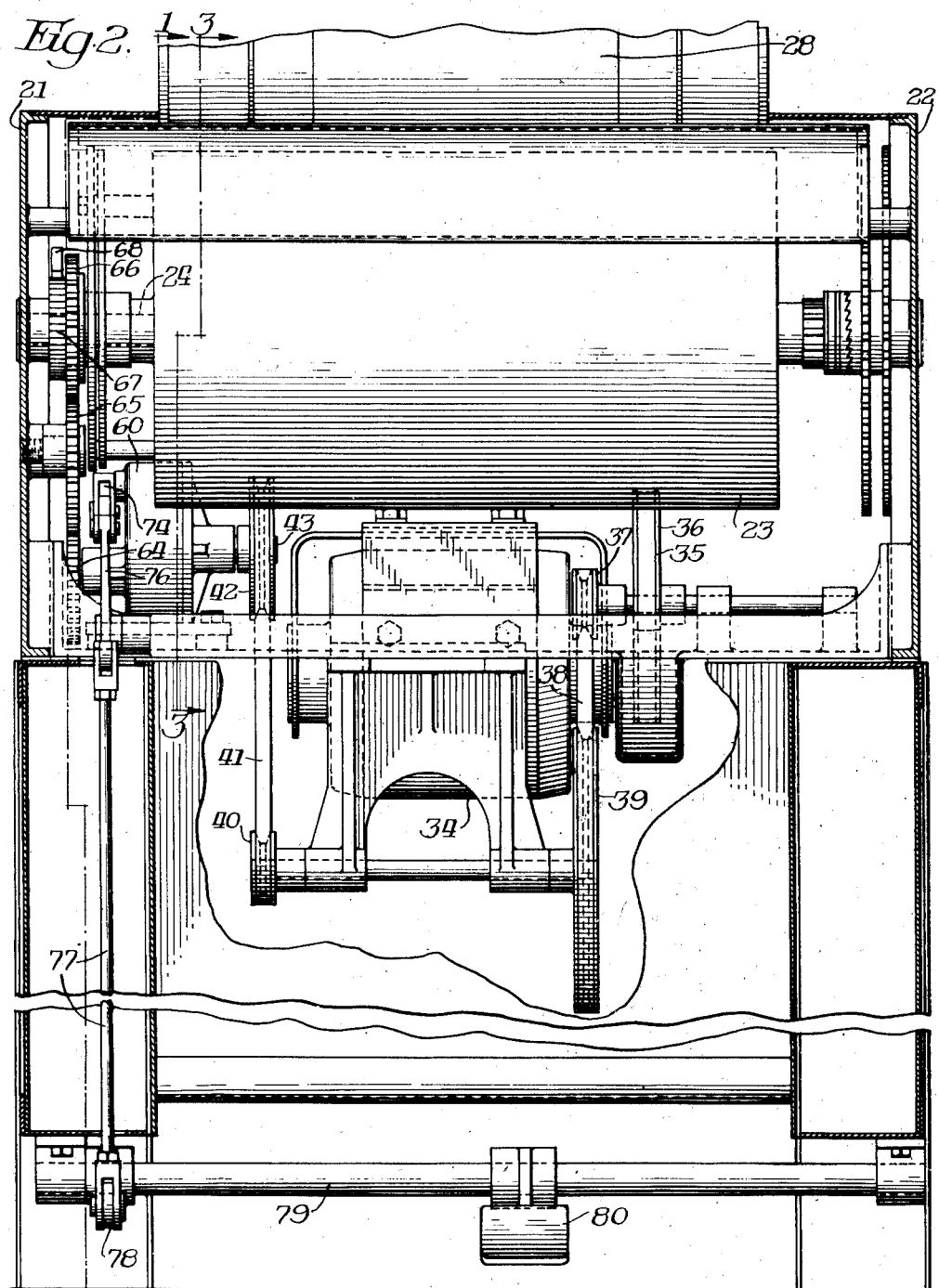
Fig. 2 is a vertical sectional view taken substantially at the line 2—2 of Fig. 1.

Referring now to the several figures of the drawings, in which corresponding parts are indicated by the same reference characters, 20 indicates a framework preferably in the form of a housing made from sheet metal and comprising at its upper portion standards 21 and 22 at opposite sides of the machine, as shown in Fig. 2. The duplicating machine to which the driving means is applied as shown in the drawings is of the general type of duplicator as shown and claimed in Letters Patent 2,034,903, issued on the application of Hernlund, Marchev and Morrison, under date of March 24, 1936. The drawings are in many respects diagrammatic, with many of the operating parts omitted, since they form in and of themselves no part of the present invention.

In the arrangement as illustrated, a segmental drum 23 is rotatably supported in position by means of a heavy shaft 24 extending between the standards 21 and 22. The drum 23 is provided with spindles 25 and 26 for supporting a gelatin band 27 in adjusted position about the drum. An inclined tray 28 is provided for supporting a copy sheet 29 in position as shown in Fig. 3 so as to be fed between the drum 23 and an impression roller 30 rotatably mounted adjacent to the drum. A stop bar 31 is provided for controlling the position of the copy sheet 29 when presented for movement between the drum and the impression roller. Stripping rollers 32 are provided in position to engage the forward end of a copy sheet for removing it from engagement with the gelatin band 27 so as to deliver the copy sheet to a tray 33. No means is shown in the present drawings for operating the stop bar 31 for moving it into and out of operative position or for operating the stripping rollers 32. The operating means for these parts are preferably the same as are shown and described in said prior Patent 2,034,903.

Figure 1:
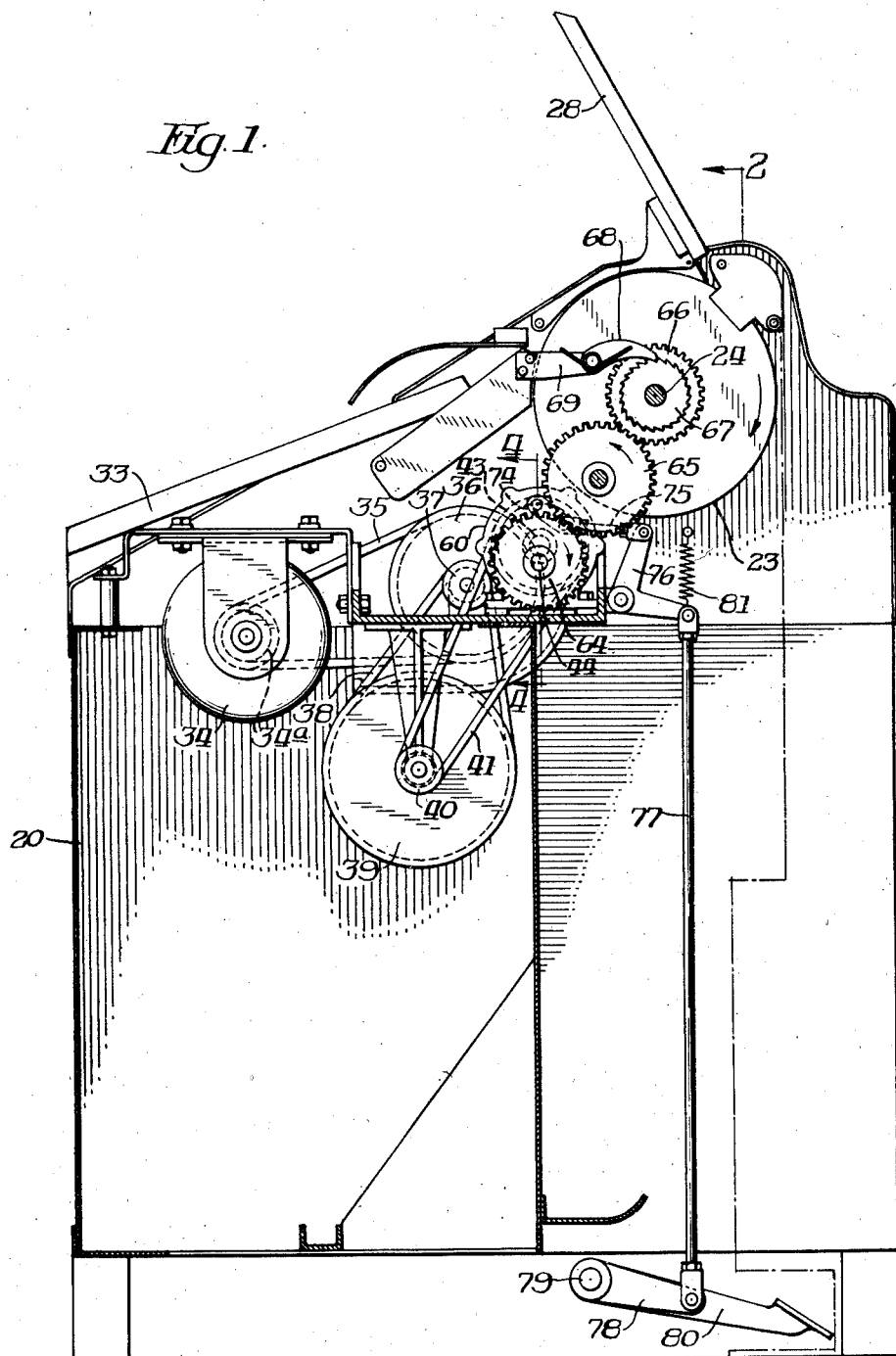
Fig. 1 is a vertical sectional view through a duplicating machine equipped with the improved driving arrangement, being substantially a section taken at the line 1—1 of Fig. 2.

For driving the drum 23 as hereinafter described, an electric motor 34 is provided (see Fig. 1), such motor being connected by a pulley 34a, a belt 35, pulleys 36 and 37, a belt 38, pulleys 39 and 40, and a belt 41 with a drive pulley 42 fixedly mounted upon a short shaft 43, as is best shown in Fig. 4.

Opposite to the short shaft 43, a second short shaft 44 is rotatably mounted, the shafts 43 and 44 being arranged in eccentric relation to each other upon parallel axes located a short distance apart. Upon the shaft 43 a head 45 is mounted in parallel relation to a head 46 upon the shaft 44. The heads 45 and 46 are provided with undercut grooves 47 and 48, respectively, in diametrical position across their adjacent faces, the groove 47 being arranged to have dovetailed engagement with a slide block 49 (see Fig. 13), and the groove 48 being arranged to have dovetailed engagement with a slide block 50, as shown in Fig. 9. As is clearly shown in said Fig. 9, the block 50 is bifurcated at its upper end so as to provide a deep groove 51 therein for the reception of a roller 52 rotatably mounted in position by means of a short spindle 53. At its lower end portion, the block 50 is round and is provided with screw-threads for holding a ring 54 adjustably in position, as is best shown in Fig. 9.

As is clearly shown in Fig. 8, the lower end portion of the block 50 is cored out so as to provide a socket 55 for the reception of a coiled spring 56, the outer end of which seats against a bearing block 57 fixedly secured in one end of the groove 48 where it is held in position by pins or bolts 58. Pins or bolts 59 are also mounted in position in the head 46 so as to engage one face of the ring or collar 54 so as to limit the radial movement of the block 50 by the spring 56 along the groove 48. As will be readily understood, by an adjustment of the ring 54 longitudinally of the block 50, the point at which the block 50 is stopped by engagement of the ring 54 with the pins or bolts 59 can be varied.

In the arrangement shown in the drawings (see Fig. 4), the shaft 53 is extended beyond the face of the head 46 into rotatable engagement with the block 49, serving as a pivotal connection means between the slide blocks 45 and 46, such pivotal connection means 53 being arranged parallel with the shafts 43 and 44. As is also best shown in said Fig. 4, the heads 45 and 46 are contained within a casing comprising a housing member 60 within which the head 46 is mounted, closed at one side by a plate 61. This housing means comprises bearing sleeves 62 and 63 for supporting the shafts 44 and 43, respectively, in cooperative relation.

Means is provided for connecting the shaft 44 with the drum 23 comprising a gear 64 fixedly mounted upon the shaft and meshing with an idler gear 65 which in turn engages a gear 66 fixedly mounted upon the shaft 24 of the drum 23. In the arrangement shown, the shaft 24 is also provided with a ratchet wheel 67 with which a pivotally mounted pawl 68 engages for holding the drum against rotation in reverse direction. In the arrangement shown, the pawl 68 is pivotally mounted upon an arm 69 connected with the framework at one end of the drum (see Fig. 1).

The means provided for moving the slide block 50 against the action of the spring 56 comprises an arm 70 pivotally mounted upon an eccentric pin 71 adjustably mounted in a suitable bearing in the housing member 60, as is best shown in Fig. 5. As is clear from an inspection of Fig. 4, the arm 70 is positioned directly above the roller 52 carried by the slide block 50 so that when the arm 70 is moved downwardly into the position as shown in Fig. 14 the roller 52 by engagement with the arm causes the block 50 to move along the groove 48 against the action of the spring 56. The arrangement is such that when the parts reach the position as shown in said Fig. 14, the shaft 53 forming the pivotal connection means between the blocks 49 and 50 stands in concentric position with respect to the drive shaft 43. Under such circumstances, the drive shaft 43 is enabled to rotate indefinitely without applying any power to the block 50 or the shaft 44. When however the arm 70 is caused to move upwardly from the position shown in Fig. 14 to the position as shown in Fig. 7, the pivotal connection means 53 is then brought into eccentric position with respect to the axis of the drive shaft 43, whereupon power is applied through the pivotal connection means 53 to the block 50, the head 46 and the shaft 44 for driving the gear 64. The arrangement is such, by reason of the eccentricity of the shafts 43 and 44, that as the parts are driven in counterclockwise direction in Fig. 7 from the position as there shown the leverage between the drive shaft and the driven shaft is gradually increased so as to cause the driven shaft to be rotated at continuously increasing speed, such increase in the leverage continuing until the drive shaft has completed a half revolution, after which the leverage is continuously decreased again until the parts are brought back to the condition as shown in said Fig. 7.

For giving the arm 70 operative movement toward and from the driven shaft 44, a cam 72 is rotatably mounted upon a shaft 73 adjacent to the arm 70 (see Fig. 4). When the shaft and cam are in the position as shown in Fig. 7, the arm 70 is held in its raised position by means of a coiled spring 73a. When however the cam 72 is turned in counterclockwise direction in Fig. 7 to the position as shown in Fig. 14, the cam 72 forces the arm 70 downwardly into position to engage the roller 52 for displacing the slide block 50 against the action of the spring 56. The means shown for giving the cam 72 an operative stroke in counterclockwise direction in Fig. 7 comprises an arm 74 carried by the shaft 73 and connected at its free end with a link 75 which in turn is connected with one arm of a bellcrank lever 76, the other arm of which is pivotally connected with a vertically disposed link 77 connected at its lower end with an arm 78 mounted upon a shaft 79 carrying a foot lever 80. A spring 81 is connected with the link 77 for holding the link normally in its raised position, as is clearly shown in Fig. 1. The arrangement is such that when the treadle 80 is moved downwardly the link 77 and the bellcrank lever 76 are actuated against the force of the spring 81 for carrying the link 75 toward the right in Fig. 1, or toward the left in Fig. 7, so as to permit the arm 70 to be held in raised position as shown in said Fig. 7. Whenever the operator desires to stop the rotation of the drum, he removes the pressure from the foot lever 80 so as to permit the spring 81 to move the bellcrank lever 76 in counterclockwise direction in Fig. 1 for rotating the shaft 72 in clockwise direction in Fig. 1, and counterclockwise direction in Fig. 7, for causing the arm 70 to be lowered into the position as shown in Fig. 14. When in the continued rotation of the shaft 43 the roller 52 is brought into engagement with the arm 70, the roller is cammed inwardly into the position as shown in Fig. 14 for terminating the application of pressure on the driven shaft 44.

Means is provided in connection with the arm 70 for holding the driven shaft 44 releasably in the position as shown in Fig. 14. This means comprises a latch arm 82 pivotally mounted upon the shaft 71 with its free end overlying the head 46 carried by the driven shaft 44. The latch arm 82 is yieldingly connected with the arm 70 by means of a coiled spring 83 so as to be caused to move yieldingly upwardly and downwardly with said arm 70. The arrangement is such that when the arm 70 is moved downwardly into the position as shown in Fig. 14, the latch arm 82 is moved downwardly also so as to engage the face of the head 46. When the parts are brought into the position as shown in said Fig. 14, the end of the latch arm 82 snaps into engagement with a notch 84 in the circular face of the head 46 serving to hold the head releasably in the position as shown in said Fig. 14. By reason of the mounting of the arms 70 and 82 upon an eccentric 71 shown in Fig. 5, it will be appreciated that the position of the latch lever 82 can be adjusted so as to cause the head 46 to be stopped at precisely the desired position. A cap 85 is adjustably mounted by means of screw-threads about the head of the eccentric pin 71 for holding such pin firmly in any adjusted position to which it is moved.

In Figs. 15, 16 and 17, which are diagrammatic for showing the relations of the parts, changed positions of the driving heads are illustrated. In Fig. 15, the parts are in the normal stop position corresponding to the showing of Fig. 7. In Fig. 16 showing the driving head 45 rotated through a quarter of a revolution in clockwise direction, the driven head and the drum have been rotated through perhaps an eighth of a revolution or less after a smooth and gradual start for building up speed. During the next following quarter of a revolution of the driving head 45 to the position as shown in Fig. 17, the driven head and the drum turn at comparatively much higher speed through about three-eighths of a complete revolution. In the continued rotation of the parts again to the position as shown in Fig. 15, the major portion of the movement of the driven head and the drum is accomplished in the third quarter of the revolution of the drive shaft, with the comparatively small remaining portion of the movement of the drum accomplished at constantly decreasing speed during the fourth quarter of the movement of the drive shaft. It will be understood that the drum 23 gathers speed very gradually and smoothly during the first half of the revolution of the drive shaft and decreases in speed just as gradually and smoothly in the last half of the revolution of the drive shaft.

By the use of the improved arrangement as shown by my drawings and as above described, the movement of the drum through successive complete revolutions is made as smooth and easy as is possible with a minimum of strain upon the parts. As a result of this arrangement, the drum can be made comparatively heavy without unduly affecting the problem of driving and controlling it, the machine being thus made stronger and more durable. As an alternative, and in lieu of increasing the weight and strength of the parts, I am able by my improved arrangement and the increased smoothness of operation to increase the number of revolutions per minute at which the machine is driven without unduly increasing the difficulty of control of the drum and its cooperating parts and without detracting in any way from the effectiveness of the duplicating operation.

By my improved arrangement, the torque required for starting and stopping the drum is very substantially reduced, the torque being equal to mass times acceleration. When the acceleration to high speed is substantially instantaneous, the torque must of course be correspondingly great. When, on the other hand, the acceleration and deceleration are brought about gradually and smoothly within an appreciable period, as is done in my improved machine, the torque required is greatly reduced and the wear and tear on the parts are correspondingly cut down. In the duplicating machine as illustrated (see Fig. 15), the gelatin band 27 is brought into pressure relationship with the impression roller 30 shortly after the start of the rotation of the drum from its normal stop position and the margin bar 31 is moved out of operative position immediately thereafter, and it is highly important that the movement of the drum be comparatively slow at this point of its rotation for keeping to a minimum the force of the impact of the gelatin band against the copy sheet and the impression roller and for providing as long a period as possible for moving the margin bar out of the way. If other means were relied upon for stopping the drum automatically at the slow speed point in its rotation without the use of the arm 70 and cam 72 for changing the position of the slide block 50, the advantages of the construction would still be obtained to a large degree in that the problem of stopping the drum at slow speed and of again starting the drum at slow speed is greatly simplified as compared with that of effecting a stop and start at high speed.

In my improved arrangement, the shaft or spindle 53 serves as a connecting part through which power is applied from the shaft 43 to the shaft 44. This connecting part 53 is held in position at any desired adjusted distance from the axis of the shaft 44, being pressed outwardly by the spring 56 and being limited in its outward movement by the pins 59 engaging the adjustable pin or collar 54. A shifting bearing for the connecting part 53 on the shaft 43 is provided by the use of the block 49 slidably engaging the groove 47 in the head 45, such shifting bearing means serving to cause the connecting part 53 to revolve with the shaft 43 about the axis of the shaft. As a result of this arrangement, the shaft 43 by rotation at uniform speed gives the shaft 44 alternately accelerating and decelerating movements in each revolution.

While the improved drive mechanism has been shown in connection with a duplicating machine in which the drum is brought to a stop automatically at the end of each complete revolution, it is to be understood that the invention is not necessarily to be limited to this particular use, since it may be applied in many different situations where intermittent motion is desired or required or where it is desired that the motion of a part be slowed up at some particular point for some special reason.

It is to be understood also that the invention is not to be limited to the arrangement as shown by the drawings except so far as the claims may be so limited, since it is clear that changes might well be made in the form and arrangement of the parts without departing from the spirit of the invention.

I claim:

1. In a mechanism of the type described, the combination of a duplicating drum, means adapted by cooperation with said drum to print and deliver a plurality of copy sheets presented one at a time to the drum, two shafts rotatable about parallel axes located in slightly spaced relation to each other, a connecting part, means for connecting said connecting part movably with one of said shafts adapted to hold the connecting part normally in eccentric position with respect to said shaft so as to be movable toward the axis of said shaft, means providing a shifting bearing for said connecting part on said other shaft for causing said connecting part to revolve about the axis of said other shaft whereby said other shaft by rotation at uniform speed serves through said connecting part to give said one shaft alternately accelerating and decelerating movements in each revolution, means connecting said one shaft with said drum for rotating the drum, and means adapted at a predetermined point in the rotation of said drum to move said connecting part into changed position with respect to said one shaft for varying the driving effect of said other shaft.

2. In a mechanism of the type described, the combination of a segmental duplicating drum, means for securing a gelatin pad on said drum, an impression roller rotatably mounted in position to press a copy sheet against said gelatin pad as the drum rotates, means for feeding a copy sheet between the impression roller and the gelatin pad, two shafts rotatable about parallel axes in slightly spaced relation to each other, a connecting part, means for connecting said connecting part movably with one of said shafts adapted to hold the connecting part normally in eccentric position with respect to said shaft so as to be movable toward the axis of the shaft, means providing a shifting bearing for said connecting part on said other shaft for causing said connecting part to revolve about the axis of said other shaft whereby said other shaft by rotation at uniform speed serves through said connecting part to give said one shaft alternately accelerating and decelerating movements in each revolution, and means connecting said one shaft with said drum and arranged and timed so that the gelatin pad on the drum is brought into pressure relationship with said impression roller on each revolution of the drum at about the time when the drum is rotating at its minimum speed.

3. In a mechanism of the type described, the combination of a duplicating drum, means adapted by cooperation with said drum to print and deliver a plurality of copy sheets presented one at a time to the drum, two shafts rotatable about parallel axes located in slightly spaced relation to each other, means for connecting one of said shafts with said drum for rotating the drum, a head rotatable with the other of said shafts, a block operatively engaging said head so as to be slidable thereacross and so as to revolve about the axis of said other shaft, a connecting part carried by said block, means for connecting said connecting part movably with said one shaft so as to be movable toward the axis of said one shaft, and spring means normally pressing said connecting part to the limit of its motion into eccentric position with respect to said one shaft, the arrangement being such that said other shaft serves by rotation at uniform speed to give said one shaft and said drum 4. In a mechanism of the type described, the combination of a duplicating drum, means adapted by cooperation with said drum to print and deliver a plurality of copy sheets presented one at a time to the drum, two shafts rotatable about parallel axes located in slightly spaced relation to each other, a connecting part, means comprising yielding means for securing said connecting part yieldingly in eccentric position with respect to one of said shafts so as to be movable against the action of said yielding means into concentric position with respect to said other shaft, means providing a shifting bearing for said connecting part on said other shaft for causing said connecting part to revolve about the axis of said other shaft whereby said other shaft by rotation at uniform speed serves through said connecting part to give said one shaft alternately accelerating and decelerating movements in each revolution, means connecting said one shaft with said drum for rotating the drum, and means for moving said connecting part against the action of said yielding means into concentric position with respect to said other shaft for holding said one shaft and said drum stationary in predetermined fixed position.

5. In a mechanism of the type described, the combination of a duplicating drum, means adapted by cooperation with said drum to print and deliver a plurality of copy sheets presented one at a time to the drum, two shafts rotatable about parallel axes located in slightly spaced relation to each other, means for connecting one of said shafts with said drum for rotating the drum, heads rotatable with said shafts respectively, blocks operatively engaging said heads respectively so that each block is slidable diametrically across the engaged head and that each block when in eccentric position with respect to the shaft on which it is mounted revolves about the axis of said shaft, means for pivotally connecting said blocks together on an axis parallel with the axes of said shafts, means comprising yielding means for securing the block carried by one of said shafts yieldingly in eccentric position with respect to said shaft whereby the other of said shafts by rotation at a uniform speed gives said one shaft alternately accelerating and decelerating movements in each revolution, and means for moving the block carried by said one shaft against the action of said yielding means into concentric position with respect to said other shaft for holding said one shaft and said drum stationary in predetermined fixed position.

6. In a mechanism of the type described, the combination of two members rotatable about parallel axes located in slightly spaced relation to each other, a connecting part, means for connecting said connecting part movably with one of said members in eccentric position with respect to said one member so as to be movable toward the axis of said member, means for rotating the other of said members, means for giving said connecting part alternate movements toward and from the axis of said other member upon each revolution of said other member, and means providing a shifting bearing for said connecting part on said other member for causing said connecting part to revolve about the axis of said other member whereby said other member by rotation at uniform speed serves through said connecting part to give said one member alternately accelerating and decelerating movements in each revolution.

7. In a mechanism of the type described, the combination of two members rotatable about parallel axes located in slightly spaced relation to each other, a connecting part, means comprising yielding means for securing said connecting part yieldingly in eccentric position with respect to one of said members so as to be movable against the force of said yielding means into concentric position with respect to said other member, means providing a shifting bearing for said connecting part on said other member for causing said connecting part to revolve about the axis of said other member whereby said other member by rotation at uniform speed gives said one member alternately accelerating and decelerating movements in each revolution, means for rotating said other member, and means for moving said connecting part against the action of said yielding means toward the axis of said other member upon each revolution of said other member.

8. In a mechanism of the type described, the combination of two members rotatable about parallel axes located in slightly spaced relation to each other, blocks operatively engaging said members respectively so as to be slidable toward and from the axes of said rotatable members, means pivotally connecting said slide blocks together, and means for holding one of said slide blocks in eccentric position with respect to the rotatable member with which it is slidably engaged for enabling one rotatable member by rotation at a uniform speed to drive the other rotatable member at a constantly changing speed.

9. In a mechanism of the type described, the combination of two shafts rotatable about parallel axes located in slightly spaced relation to each other, heads mounted on said shafts respectively in spaced parallel relation to each other, slide blocks movable in grooves across the adjacent faces of said two heads respectively, means pivotally connecting said two slide blocks together on an axis parallel with said shafts, and means for holding one of said slide blocks in eccentric position with respect to the grooved head in which it is mounted for enabling one rotatable member by rotation at a uniform speed to drive the other rotatable member at variable speed.

10. In a mechanism of the type described, the combination of two heads rotatable in parallel spaced relation to each other about parallel axes located in slightly spaced relation to each other, each of said heads having an undercut groove in diametrical position across its face, slide blocks having dovetailed engagement with said grooves respectively, means pivotally connecting said two slide blocks together on an axis parallel with the axes about which said heads are rotatable, and means comprising a spring for holding one of said slide blocks yieldingly in eccentric position with respect to the grooved head in which it is mounted so as to be movable against the action of said spring into changed position with respect to the axis of said head.

11. In a mechanism of the type described, the combination of two members rotatable about parallel axes located in slightly spaced relation to each other, a connecting part, means for connecting said connecting part movably with one of said members adapted to hold the connecting part in any desired adjusted eccentric position with respect to said member, means providing a shifting bearing for said connecting part on said other member for causing said connecting part to revolve about the axis of said other member whereby said other member by rotation at uniform speed serves through said connecting part to give said one member alternately accelerating and decelerating movements in each revolution, and means actuated in timed relation to the operation of the mechanism for automatically shifting said connecting part into changed eccentric position with respect to said one member.

12. In a mechanism of the type described, the combination of two members rotatable about parallel axes located in slightly spaced relation to each other, a connecting part, means comprising a spring for securing said connecting part yieldingly in eccentric position with respect to one of said members so as to be movable against the force of said spring into concentric position with respect to said other member, means providing a shifting bearing for said connecting part on said other member for causing said connecting part to revolve about the axis of said other member whereby said other member by rotation at uniform speed gives said one member alternately accelerating and decelerating movements in each revolution, and means acting in timed relation to the movement of the mechanism adapted when said one member moves at approximately its minimum speed with the connecting part at its normal eccentric position to move said connecting part against the action of said spring into concentric position with respect to said other member for terminating the drive of said one member by said other member.

13. In a mechanism of the type described, the combination of two members rotatable about parallel axes located in slightly spaced relation to each other, blocks operatively engaging said members respectively so as to be slidable toward and from the axes of said rotatable members, means pivotally connecting said slide blocks together, yielding means carried by one of said members and pressing the block thereon outwardly away from the axis of said member, adjustable means for limiting the outward movement of said block by said yielding means whereby the axis upon which said two blocks are pivotally connected together is normally held in a predetermined adjusted eccentric position with respect to said one member and whereby said other member by rotation at a uniform speed gives said one member alternately accelerating and decelerating movements in each revolution, and means adapted as said driven member is decelerated to move the slide block carried thereby inwardly against the action of said yielding means for bridging the axis on which said two blocks are connected into concentric position with respect to said other member for terminating the drive of said one member by said other member.

14. In a mechanism of the type described, the combination of two members rotatable about parallel axes located in slightly spaced relation to each other, a connecting part, means connecting said connecting part effectively with said two members so as to hold the connecting part normally in a predetermined eccentric position with respect to one of said members and in shifting eccentric position with respect to the other member throughout the major portion of a complete revolution of said one member whereby said other member by rotation at a uniform speed gives said one member alternately accelerating and decelerating movements in each revolution, and means adapted after said one member has been greatly slowed down to move said connecting part into concentric position with respect to said other member for terminating the drive of said one member by said other member.

15. In a mechanism of the type described, the combination of two shafts rotatable about parallel axes located in slightly spaced relation to each other, heads mounted on said shafts respectively in spaced parallel relation to each other, slide blocks movable in grooves across the adjacent faces of said two heads respectively, means pivotally connecting said two slide blocks together on an axis parallel with said shafts, means for holding the block mounted on one of said shafts normally in a predetermined eccentric position with respect to said shaft throughout the major portion of a complete revolution of the shaft whereby said other shaft by rotation at a uniform speed gives said one shaft alternately accelerating and decelerating movements in each revolution, and means adapted after said one shaft has been greatly slowed down to move said pivotal connection means into concentric position with respect to said other shaft for terminating the drive of said one shaft by said other shaft.

16. In a mechanism of the type described, the combination of two members rotatable about parallel axes located in slightly spaced relation to each other, a connecting part, means comprising a spring for securing said connecting part yieldingly in eccentric position with respect to one of said members so as to be movable against the force of said spring into concentric position with respect to said other member, means providing a shifting bearing for said connecting part on said other member for causing said connecting part to revolve about the axis of said other member whereby said other member by rotation at uniform speed gives said one member alternately accelerating and decelerating movements in each revolution, an arm movably mounted so as to be adjustable toward and from said one member adapted in its inwardly adjusted position to have a camming action by which said connecting part is moved into concentric position with respect to said other member, and means for giving said arm an operative stroke inwardly after said one member has been greatly slowed down so as to terminate the drive of said one member by said other member.

17. In a mechanism of the type described, the combination of two members rotatable about parallel axes located in slightly spaced relation to each other, blocks operatively engaging said members respectively so as to be slidable toward and from the axes of said members, means pivotally connecting said slide blocks together, means adapted normally to hold the slide block engaging one of said members yieldingly in a predetermined adjusted eccentric position with respect to said member whereby said other member by rotation at a uniform speed gives said one member alternately accelerating and decelerating movements in each revolution, an arm movably mounted so as to be adjustable toward and from said one member adapted in its inwardly adjusted position by a camming action to move the block engaging said one member into concentric position with respect to said other member, and means for giving said arm an operative stroke inwardly after said one member has been greatly slowed down so as to terminate the drive of said one member by said other member.

18. In a mechanism of the type described, the combination of two members rotatable about parallel axes located in slightly spaced relation to each other, a connecting part, means comprising a spring for securing said connecting part yieldingly in eccentric position with respect to one of said members so as to be movable against the force of said spring into concentric position with respect to said other member, means providing a shifting bearing for said connecting part on said other member for causing said connecting part to revolve about the axis of said other member whereby said other member by rotation at uniform speed gives said one member alternately accelerating and decelerating movements in each revolution, an arm pivotally mounted so as to swing toward and from said one member adapted in its inwardly adjusted position to have a camming action by which said connecting part is moved into concentric position with respect to said other member, a cam movably mounted adjacent to said arm adapted by an operative stroke to give said arm a movement inwardly into operative position with respect to said connecting part, and means for giving said cam an operative movement after said one member has been greatly slowed down so as to terminate the drive of said one member by said other member.

19. In a mechanism of the type described, the combination of two members rotatable about parallel axes located in slightly spaced relation to each other, a connecting part, means connecting said connecting part effectively with said two members so as to hold the connecting part normally in a predetermined eccentric position with respect to one of said members and in shifting eccentric position with respect to the other member throughout the major portion of a complete revolution of said one member whereby said other member by rotation at a uniform speed gives said one member alternately accelerating and decelerating movements in each revolution, means adapted after said one member has been greatly slowed down to move said connecting part into concentric position with respect to said other member for terminating the drive of said one member by said other member, and latch means automatically operative when the drive of said one member is terminated to hold said member releasably in a predetermined fixed position.

20. In a mechanism of the type described, the combination of two members rotatable about parallel axes located in slightly spaced relation to each other, a connecting part, means comprising a spring for securing said connecting part yieldingly in eccentric position with respect to one of said members so as to be movable against the force of said spring into concentric position with respect to said other member, means providing a shifting bearing for said connecting part on said other member for causing said connecting part to revolve about the axis of said other member whereby said other member by rotation at uniform speed gives said one member alternately accelerating and decelerating movements in each revolution, an arm movably mounted so as to be adjustable toward and from said one member adapted in its inwardly adjusted position to have a camming action by which said connecting part is moved into concentric position with respect to said other member, means for giving said arm an operative stroke inwardly after said one member has been greatly slowed down so as to terminate the drive of said one member by said other member, and latch means yieldingly connected with said arm so as normally to swing inwardly with said arm and automatically operative when the drive of said one member is terminated to hold said member releasably in a predetermined fixed position.

21. In a mechanism of the type described, the combination of two members rotatable about parallel axes located in slightly spaced relation to each other, a connecting part, means comprising a spring for securing said connecting part yieldingly in eccentric position with respect to one of said members so as to be movable against the force of said spring into concentric position with respect to said other member, means providing a shifting bearing for said connecting part on said other member for causing said connecting part to revolve about the axis of said other member whereby said other member by rotation at uniform speed gives said one member alternately accelerating and decelerating movements in each revolution, means adapted as said driven member is decelerated to move said connecting part against the action of said yielding means into concentric position with respect to said other member for terminating the drive of said one member by said other member, and means adapted when said connecting part moves again into eccentric position with respect to said one member to hold said one member from rotary movement in the direction opposite to that in which it is normally driven.

JOHN R. NALBACH.